United States Patent Office 3,519,590
Patented July 7, 1970

3,519,590
STABLE ETHYLENE COPOLYMER AQUEOUS DISPERSIONS
Raymond M. Henry and Rajindar K. Kochhar, Overland Park, Kans., assignors to Gulf Research & Development Company, Pittsburgh, Pa., a corporation of Delaware
No Drawing. Filed Dec. 28, 1966, Ser. No. 605,495
Int. Cl. C08f 45/56, 47/18
U.S. Cl. 260—29.6
15 Claims

ABSTRACT OF THE DISCLOSURE

The viscosity stability of aqueous dispersions of amide-containing self-emulsifiable ethylene-alkyl acrylate polymers is increased by controlling the pH of such aqueous dispersions.

CROSS REFERENCES TO RELATED APPLICATIONS

Copending application Ser. No. 131,108, filed Aug. 14, 1961, by Jack Hurst and Harry D. Anspon describes the preparation of water-insoluble, self-emulsifiable amide-containing ethylene-alkyl acrylate interpolymers by the hydrolysis of the acrylate groups of a thermoplastic ethylene-alkyl acrylate interpolymer. The hydrolysis is conducted in an aqueous medium employing elevated temperatures, a nitrogenous base such as ammonium hydroxide and a metallic base. The product of the hydrolysis reaction is an ethylene-alkyl acrylate interpolymer wherein a self-emulsifiable portion of the acrylate groups are in hydrophilic form.

Copending application Ser. No. 331,941, filed Dec. 19, 1963, by Charles F. Feldman and Raymond M. Henry, describes a method of preparing mixed aqueous dispersions of the above-described self-emulsifiable ethylene-alkyl acrylate interpolymers and elastomeric polymers having at least one monomer selected from the group consisting of isobutylene, butadiene, chloroprene and isoprene. Reference is made to the above applications for complete descriptions of the methods of preparing aqueous polymeric dispersions applicable in the hereafter described invention.

BACKGROUND OF THE INVENTION

This invention relates to a process for increasing the viscosity stability of aqueous dispersions of water-insoluble, self-emulsifiable ethylene-alkyl acrylate polymers wherein at least a portion of the contained acrylate groups are in amide form.

The application of stable polymeric emulsions for fabricating materials such as paper, woven fabrics, wood, metal, glass and the like has grown to a wide usage. It has been observed that these materials and conventional polymeric films can be improved in properties such as water impermeability by the application of a stable polymeric emulsion. It is contemplated that even greater usage will be made of economical polymeric emulsions or dispersions which are readily reproducible and which have improved stability and other desired characteristics. The particular desired polymeric dispersions are those which do not require the addition of emulsifying agents, either during polymerization or by post addition. These emulsifying agents, conventionally required in polymeric emulsions, detract from the desirable properties of the emulsified polymeric materials by, for example, reducing tensile strength, reducing freeze-thaw stability, reducing stability to high heat conditions, increasing water spotting in films prepared from the polymers, and the like.

Aqueous dispersions of self-emulsifiable ethylene-alkyl acrylate polymers containing pendant amide groups are particularly desirable as coating compositions and as an adhesive constituent when combined with elastomeric polymeric material as described in copending application Ser. No. 331,941. From an economical viewpoint it is highly desirable that the dispersions employed as coating or adhesive compositions have relatively low Brookfield viscosities, less than 1500 cps., and be substantially viscosity-stable for ease in handling and applying the dispersions to various substrates. It has been observed that aqueous dispersions containing in excess of 20 weight percent self-emulsifiable ethylene-alkyl acrylate polymer solids, said polymers containing pendant amide groups, conventionally rapidly increase in viscosity during storage periods. Aqueous dispersions stored for long periods of time become highly viscous and in many cases form gels. Aqueous dispersions having Brookfield viscosities in excess of 1500 cps. are normally too highly viscous for commercial utilization as aqueous dispersions.

Accordingly, an object of the invention is to increase the viscosity stability of aqueous dispersions containing self-emulsifiable ethylene-alkyl acrylate polymers, said polymers containing pendant amide groups.

Another object of the invention is to lower the viscosity of highly viscous aqueous dispersions containing self-emulsifiable ethylene-alkyl acrylate polymers containing pendant amide groups.

Other objects, advantages and features of the invention will be readily apparent to those skilled in the art from the following description and the appendant claims.

SUMMARY OF THE INVENTION

By the invention the viscosity stability of aqueous dispersions of water-insoluble, but self-emulsifiable ethylene-alkyl acrylate polymers containing pendant amide groups is substantially increased by maintaining the pH of said aqueous dispersions above 10.6. The viscosity of highly viscous aqueous dispersions having a pH below 10.6 and containing water-insoluble, but self-emulsifiable, ethylene-alkyl acrylate polymers containing pendant amide groups can be reduced by increasing the pH of said aqueous dispersions to at least 10.6. These highly viscous aqueous dispersions also include gels formed from aqueous dispersions of self-emulsifiable ethylene-alkyl acrylate polymers. Normally, the pH of said aqueous dispersions will be maintained in the range of 10.6 to 11.6 and preferably in the range of 10.9 to 11.2.

It has been observed that the most desired pH control range is related to the particular pH control agent employed. With an alkali hydroxide employed as the pH control agent, the pH of the aqueous dispersions is normally maintained in the range of 10.6 to 11.6 and with ammonia or ammonium hydroxide employed as the pH control agent, the pH of the aqueous dispersions is preferably maintained between 10.8 and 11.2.

DESCRIPTION OF THE INVENTION

"Ethylene groups" and "acrylate groups" as used herein in defining the ethylene-alkyl acrylate polymeric compositions of this invention correspond to the ethylene and acrylate monomers, respectively, which are polymerized in forming the polymer. "Water-insoluble" as used herein refers to the inability of the fused solid ethylene-alkyl acrylate polymer to become substantially dissolved in water and measured, for example, by preparing a one-half mil cast film of the product polymer, placing a 10 x 10 centimeter sample in one liter of water maintained at a temperature of 30° C. for a period of 24 hours, removing the film from the water, drying the film to a constant weight at 120° C., and determining that the weight loss in the film when compared to the weight of the original film sample shall be less than 10 weight percent. "Self-emulsifiable" as used herein refers to that property of the polymer whereby one gram of the polymer in particulate form can be readily dispersed in 100 ml., of water in a stirred metal autoclave maintained at a temperature in the range of 180 to 300° C. to provide, in the absence of an emulsifying agent, a shelf-stable dispersion wherein the average particle size is less than two microns.

The ethylene-alkyl acrylate polymers of the aqueous dispersions of this invention contain from about 0.01 to about 0.5 (preferably from about 0.025 to about 0.25) mol of contained acrylate groups per mol of contained ethylene groups. The polymeric compositions can be viewed generally as a polyethylene chain containing units (a), (b) and (c) as hereinafter defined, and optionally, one of the hereinafter defined following units (d) and (e),
said units (a) having the structure $$-CH_2-CH_2-$$

said units (b) having the structure

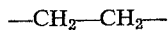

said units (c) having the structure

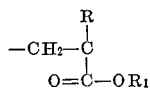

said units (d) having the structure

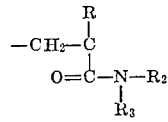

said units (e) having the structure

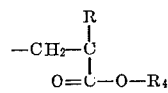

wherein R is selected from the group consisting of hydrogen and hydrocarbon groups, $R_1$ is selected from the group consisting of the alkali metal and ammonium ions, $R_2$ and $R_3$ are independently selected from the group consisting of hydrogen, hydrocarbon groups and hydroxyalkyl groups, and $R_4$ is a hydrocarbon group. From 10 to 60 mol percent of the acrylate groups are present as units (b); from 10 to 60 mol percent of the acrylate groups are present as units (d); and from 0 to 80 mol percent of the acrylate groups are present as units (d) or units (e).

The aqueous dispersions of this invention can also include additional polymeric solids such as the elastomeric polymers described in copending application Ser. No. 331,941, filed Dec. 19, 1963, by Charles F. Feldman and Raymond M. Henry. Such elastomeric polymers contain at least one monomer selected from the group consisting of isobutylene, butadiene, chloropropene and isoprene. Elastomeric polymers which can readily be employed in preparing the mixed aqueous dispersions of this invention include the butadiene-styrene copolymers and the butadiene-acrylonitrile copolymers.

The invention is directed to maintaining viscosity-stable aqueous dispersions of the above-described polymeric materials and is particularly applicable wherein the concentration of solids contained in such dispersions is in the range of 20–65 weight percent. Viscosity stability is maintained by measuring the pH of the aqueous dispersion and adding thereto a basic pH control agent in an amount sufficient to maintain the pH above 10.6. The viscosity of the aqueous dispersions is measured by employing the Brookfield Viscometer, Model LVF, utilizing a spindle speed of 60 r.p.m. or 100 r.p.m. with the viscosity measured at the temperature of 23° C. pH control agents employed to maintain the above-described aqueous dispersion viscosity stable preferably are selected from the alkali metal hydroxides, ammonia, and ammonium hydroxide. Other bases such as the water-soluble aliphatic, aromatic or heterocyclic monoamines, or a mixture of the bases can be employed, but the use of such other basic pH control agents may introduce residual constituents into the aqueous dispersion which may adversely affect the commercial utilization of the aqueous dispersion. When an alkali hydroxide is employed as a pH control agent the pH of the aqueous dispersion is desirably maintained in the range of 10.6 to 11.6 and more preferably in the range of 10.9 to 11.2. Of the alkali hydroxides employed in controlling the pH of the aqueous dispersions, sodium hydroxide, potassium hydroxide, cesium hydroxide and rubidium hydroxide are preferred. When ammonia or ammonium hydroxide is employed as a pH control agent the pH of the aqueous dispersion is desirably maintained between 10.8 and 11.2.

The invention has been found to be particularly effective in maintaining aqueous dispersions of ethylene-alkyl acrylate polymers viscosity-stable which have been stored for periods in excess of 90 days. It has further been observed that aqueous dispersions of ethylene-alkyl acrylate polymers wherein the amide concentration of the polymers is relatively high conventionally become viscosity-instable at an accelerated rate. By the invention aqueous dispersions of such high amide-containing polymers have been maintained viscosity-stable for storage periods in excess of 270 days. The Brookfield viscosity increase of the aqueous dispersions of this invention will nominally be less than 1200 cps. during a continuous period of at least 120 days when stored at ambient conditions with storage temperatures ranging above the freeze point of the aqueous dispersion and below the boiling temperature.

The following examples are presented to illustrate the objects and advantages of the invention. It is not intended that the invention should be limited to the specific embodiments presented therein.

Example I

An aqueous dispersion of a self-emulsifiable ethylene-methyl acrylate polymer containing 50 mol percent, on the basis of pendant groups, of —COONa groups, 35 mol percent —CONH$_2$ groups, 10 mol percent —COOH groups and 5 mol percent methyl acrylate groups was prepared from ethylene-methyl acrylate copolymer containing 20 weight percent methyl acrylate by the process described in copending application Ser. No. 131,108. The emulsion had a pH of 10.0 and a Brookfield viscosity of 177 cps. measured at 23° C. Samples of this dispersion were adjusted to a solids content of 22.8 weight percent and to different pH values by the addition of ammonium hydroxide solution and stored at ambient temperatures. Table I compares the change in viscosity of these samples with time. The pH of each of the aqueous dispersions of Runs 2–4 was continuously maintained above 10.6.

TABLE I

| Run No. | pH | Brookfield Viscosity, cps. | | | | |
|---|---|---|---|---|---|---|
| | | Initial | After 1 day | After 32 days | After 124 days | After 195 days |
| 1 | 10.00 | 172 | 177 | 226 | 2,460 | Gel |
| 2 | 10.80 | 134 | 126 | 103 | 136 | 681 |
| 3 | 11.09 | 117 | 108 | 97 | 165 | 309 |
| 4 | 11.20 | 107 | 111 | 102 | 188 | 874 |

From the above runs the viscosity stability increase effected by maintaining the pH of the dispersion above 10.6 is clearly established. Whereas the aqueous dispersion of Run 1 (control) increased to 2460 cps. after 124 days, the viscosity of the aqueous dispersions of Runs 2–4 did not exceed 874 cps. after a storage of 95 days.

Example II

This example demonstrates the viscosity stability achieved when employing sodium hydroxide as the pH control agent and the aqueous dispersion of Example I containing 22.3 percent solids. Samples were adjusted to different pH values with aqueous 2 N, sodium hydroxide and stored at ambient temperature over a period of 183 days. The pH of the aqueous dispersions of Runs 6 and 7 was continuously maintained above 10.6. The results are shown in Table II.

TABLE II

| Run No. | pH | Brookfield Viscosity, cps. | | | | |
|---|---|---|---|---|---|---|
| | | After 1 day | After 14 days | After 28 days | After 87 days | After 183 days |
| 5 | 10.00 | 8,900 | 8,400 | Gel | | |
| 6 | 10.60 | 1,138 | 265 | 320 | 604 | 4,030 |
| 7 | 11.30 | 442 | 148 | 170 | 249 | |

Runs 6 and 7 demonstrate that by maintaining the pH of the aqueous dispersion at 10.6 and above, the viscosity of the dispersion was maintained at a workable level for a period in excess of 87 days whereas the aqueous dispersion of Run 5 was so highly viscous after only 10 days as to be unsuitable for commercial application.

Example III

The aqueous dispersion of Example I which had been thickened to a viscous mass was diluted with water. The pH of the dispersion was 9.82 and the viscosity was 113,750 cps. The pH of samples of the dispersion were then adjusted by the addition of 2 N, sodium hydroxide solution. The samples were then stored at ambient temperatures and the change in viscosity with time was measured and is reported in Table III. The pH of the aqueous dispersion of Run 10 was continuously maintained above 10.6.

TABLE III

| Run No. | Percent Solids in Dispersion | pH | Brookfield Viscosity, cps. | | |
|---|---|---|---|---|---|
| | | | After 1 day | After 52 days | After 132 days |
| 8 | 21.9 | 9.82 | 113,750 | Gel | Gel |
| 9 | 21.9 | 10.40 | 2,625 | 13,940 | Gel |
| 10 | 21.9 | 11.10 | 395 | 264 | 2,038 |

Runs 8, 9 and 10 demonstrate that the viscosity of highly viscous aqueous dispersions of self-emulsifiable ethylene-alkyl acrylate polymers can be substantially reduced by increasing the pH of the dispersions to 10.6 and that the viscosity stability of the aqueous dispersion of Run 10 was substantially superior to the viscosity stability of the aqueous dispersions of Runs 8 and 9.

Example IV

An aqueous dispersion prepared from ethylene-methyl acrylate copolymers containing 21.5 weight percent methyl acrylate was treated according to the process described in copending application Ser. No. 131,108. The dispersion, on analysis, was found to contain the different pendant groups, —COONa, —CONH$_2$, —COOH and —COOCH$_3$ in the ratio of 10:7:2:1 respectively. Such a dispersion containing 22.8 percent solids thickened to a gel when stored, without stirring, for 6 months. The gel was then diluted with water and mixed with different quantities of 2 N, sodium hydroxide solution in a Waring Blendor. The effect of higher pH on viscosity after dispersion and its shelf-stability is illustrated in Table IV.

TABLE IV

| Run No. | Percent Solids in dispersion | pH | Brookfield Viscosity, cps. | | | |
|---|---|---|---|---|---|---|
| | | | After 1 hour | After 1 day | After 35 days | After 87 days |
| 11 | 22.1 | 10.5 | 985,000 | Gel | | |
| 12 | 22.1 | 11.2 | 322 | 295 | 493 | 1,340 |

Example V

In this example the effectiveness of the invention to increase the viscosity stability of an aqueous dispersion of a mixture of a self-emulsifiable ethylene-alkyl acrylate polymer and an elastomeric polymer is demonstrated. An aqueous dispersion containing 60 weight percent, on a solids basis, of a self-emulsifiable ethylene-methyl acrylate polymer and 40 weight percent, on a solids basis, of a butadiene-acrylonitrile elastomeric polymer containing 33 weight percent acrylonitrile is prepared. Runs were made employing aqueous dispersions containing in Runs 11 and 11a 27.3 weight percent solids and in Runs 12 and 12a. 28.1 weight percent solids. The Brookfield viscosity of the prepared aqueous dispersions are 144 and 72 respectively. The initial pH of the prepared aqueous dispersions are 9.9 and 9.8 respectively.

In Runs 11a and 12a a portion of the prepared aqueous dispersion is adjusted to a pH 11.0. The initial Brookfield viscosity of the pH adjusted aqueous dispersion are 360 cps., and 72 cps. respectively. Each of the prepared aqueous dispersions is stored at ambient temperatures for a period of five days. The viscosity of each of the prepared aqueous dispersions is checked periodically during the storage period with the results shown below in Table V. Runs 11a and 12a are illustrative of the invention and are compared with control Runs 11 and 12, respectively.

TABLE V

| Run No. | Brookfield Viscosity, cps. | | | |
|---|---|---|---|---|
| | Initially | After 3 days | After 4 Days | After 5 Days |
| 11 | 144 | 1,750 | 3,600 | |
| 11a | 360 | 870 | 1,300 | 1,650 |
| 12 | 60 | 1,800 | | |
| 12a | 72 | 280 | 440 | 520 |

The above runs clearly demonstrate the effectiveness of the invention to substantially increase the viscosity stability of elastomeric aqueous dispersions containing self-emulsifiable ethylene-alkyl acrylate polymers.

The pH control not only helps maintain the fluidity of a normally liquid dispersion when stored without stirring over a long period of time but it can also reduce the viscosity of a highly viscous dispersion or even a gel. The reduction in viscosity of the pH adjusted samples depends on (a) the starting viscosity of the dispersion and (b) the pH of the dispersion. The higher the viscosity of the starting material the greater is the reduction in viscosity brought about by pH adjustment.

What is claimed is:

1. A process which comprises continuously maintaining the pH of an aqueous dispersion of a water-insoluble, self-emulsifiable ethylene-alkyl acrylate polymer containing pendant amide and carboxylate salt groups above 10.6, said polymer containing from about 0.01 to about 0.5 mol of acrylate groups per mol of contained ethylene groups.

2. The process of claim 1 wherein the pH is maintained in the range of 10.6 to 11.6.

3. A process which comprises continuously maintaining the pH of an aqueous dispersion of a water-insoluble, self-emulsifiable ethylene-alkyl acrylate polymer in the range of 10.6 to 11.6, said polymer containing from about 0.01 to about 0.5 mol of acrylate groups per mol of contained ethylene groups, said polymer containing recurring units of the structures:

(a) —CH$_2$—CH$_2$—

(b) 
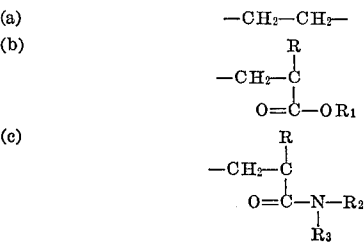

(c)

wherein R is selected from the group consisting of hydrogen and hydrocarbon groups, $R_1$ is selected from the group consisting of the alkali metals and ammonium ions, and $R_2$ and $R_3$ are independently selected from the group consisting of hydrogen, hydrocarbon groups and hydroxyalkyl groups.

4. A process which comprises continuously maintaining the pH of an aqueous dispersion of a water-insoluble, self-emulsifiable ethylene-alkyl acrylate polymer in the range of 10.6 to 11.6, said polymer containing from about 0.01 to about 0.5 mol of acrylate groups per mol of contained ethylene groups, said polymer containing recurring units of the structures:

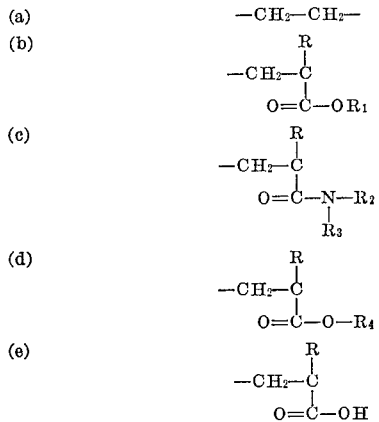

wherein R is selected from the group consisting of hydrogen and hydrocarbon groups, $R_1$ is selected from the group consisting of the alkali metals and ammonium ions, $R_2$ and $R_3$ are independently selected from the group consisting of hydrogen, hydrocarbon groups and hydroxyalkyl groups, and $R_4$ is a hydrocarbon group, from 10 to 60 mol percent of the acrylate groups being present as units (b), from 10 to 60 mol percent of the acrylate groups being present as units (c), and from 0 to 80 mol percent of the acrylate groups being present as the total of units (d) and (e).

5. The process of claim 4 wherein the pH is maintained in the range of 10.9 to 11.2.

6. The process of claim 4 wherein said polymer contains from about 0.025 to about 0.5 mol of acrylate groups per mol of contained ethylene groups.

7. The process of claim 4 wherein the pH is maintained in the range of 10.6 to 11.6 by the addition of an alkali metal hydroxide to said aqueous dispersion.

8. The process of claim 4 wherein said pH is maintained in the range of 10.6 to 11.6 by the addition of a pH control agent selected from the group consisting of ammonium hydroxide and ammonia.

9. The process of claim 7 wherein said alkali metal hydroxide is sodium hydroxide.

10. A process which comprises substantially reducing the viscosity of a highly viscous aqueous dispersion of a self-emulsifiable ethylene-alkyl acrylate polymer containing pendant amide and carboxylate groups by the addition of a base to said aqueous dispersion in a quantity sufficient to raise the pH to at least 10.6.

11. The process of claim 10 wherein said highly viscous aqueous dispersion is a gel.

12. A process which comprises continuously maintaining the pH of an aqueous dispersion of an elastomeric polymer and a water-insoluble, self-emulsifiable ethylene-alkyl acrylate polymer containing pendant amide and carboxylate groups above 10.6, said elastomeric polymer containing at least one monomer selected from the group consisting of isobutylene, butadiene, chloroprene and isoprene, and said ethylene-alkyl acrylate polymer containing from about 0.01 to about 0.5 mol of acrylate groups per mol of contained ethylene groups.

13. The process of claim 12 wherein said elastomeric polymer comprises a butadiene-acrylonitrile copolymer.

14. The process of claim 4 wherein the concentration of solids contained in said aqueous dispersion is in the range of 20–65 weight percent.

15. The process of claim 4 wherein the pH is continuously maintained in the range of 10.6 to 11.6 for a period of at least ninety (90) days during which said aqueous dispersion is maintained at a temperature above the freeze point and below the boiling temperature of said aqueous dispersion, thereby maintaining the Brookfield viscosity of said aqueous dispersion below 1500 cps.

References Cited
UNITED STATES PATENTS 3,296,175   1/1967   Fantl et al.
3,364,164   1/1968   Lyons.

MURRAY TILLMAN, Primary Examiner

W. J. BRIGGS, SR., Assistant Examiner

U.S. Cl. X.R.

260—80.73, 80.8, 80.81